May 8, 1962  A. J. R. BELFORD  3,033,237
GOGGLE OR PLATE VALVES
Filed May 1, 1959
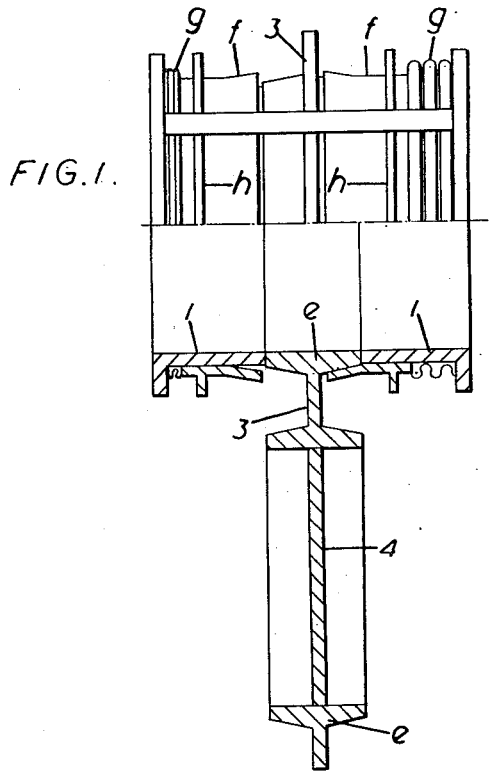
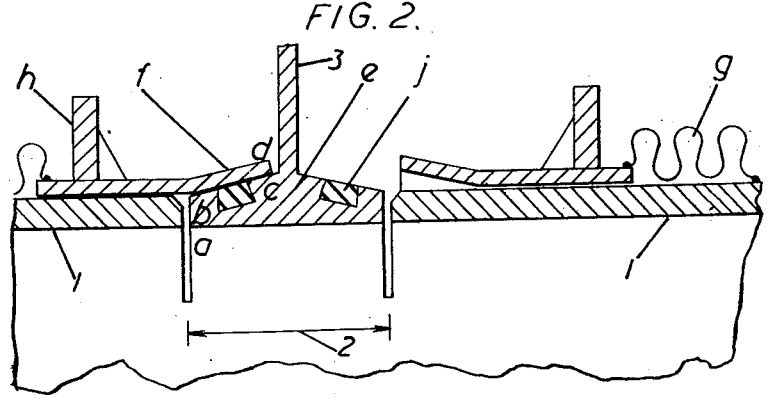
Inventor
ADAM JERROLD RHIND BELFORD,
By John B Brady
Attorney

United States Patent Office 3,033,237
Patented May 8, 1962

3,033,237
GOGGLE OR PLATE VALVES
Adam Jerrold Rhind Belford, Corby, Northants, England, assignor to Stewarts and Lloyds Limited, Glasgow, Scotland
Filed May 1, 1959, Ser. No. 810,342
Claims priority, application Great Britain June 30, 1958
5 Claims. (Cl. 138—94.3)

This invention relates to valves, especially valves for gas mains, of the kind known as goggle or plate valves and comprising a valve plate displaceable in a cross slot of a valve body so as either to blank off or afford clear passage through the body which is inserted in the main.

In known valves of this kind the valve plate is usually clamped, in either position, between two flanges of the valve body by reducing the width of the cross slot.

Such an arrangement manifests the disadvantages that (a) an efficient joint is only obtained if the flanges of the valve body and the valve plate are accurately flat or plane surfaces, because should either flange bear on the valve plate on only part of its matching sealing flange leakage will occur through those portions where contact is not made; (b) when leakage does occur the path of the escaping gas is linear as a thin laminar flow; (c) the pressure of contact of the joint faces must exceed that obtaining in the valve body, and in particular, when the valve is closed and the clamping member is at the down stream side of the valve plate, the thrust required to maintain sealing can be of considerable magnitude.

The present invention provides a goggle or plate valve that overcomes these disadvantages.

In accordance with the invention sleeves with adjacent flared end portions are slidable on the valve body, and the valve plate has rings to fit in the slot in the valve body, the width of which slot may remain fixed, the outer periphery of each ring being shaped to mate with the flared end portions of the sleeves.

The adjacent internal end portions of the sleeves and the outer peripheries of the rings may be conical or part-spherical.

Preferably the outer ends of the sleeves are attached to the valve body by means of flexible bellows, and the sleeves have flanges against which acts mechanism for displacing the sleeves to effect sealing.

Jointing gaskets may be fitted into recesses formed in the outer peripheries of the valve plate rings.

In operation the sleeves are drawn back from the cross slot in the valve body, the valve plate is then displaced to bring its "blanking off" or its "open" ring into position in the cross slot as may be required, and then the sleeves are driven forward to embrace by their flared end portions the matching periphery of the operative ring of the plate and effect a gas-tight seal.

By way of example one embodiment of the invention is illustrated on the drawing accompanying this specification, to which drawing reference is now made.

FIG. 1 is a view partly in section of the illustrated valve.

FIG. 2 is a fragmentary sectional view on a larger scale.

Each of the figures shows one of the sleeves retracted and the other in clamping position for the purpose of facilitating understanding of the invention, but it is to be understood that in practice the movement of the sleeves is synchronised so as either to be both clamped or both retracted together.

Reference 1 denotes the valve body having a cross slot or gap 2 of constant width, and 3 denotes the displaceable valve plate displaceable in its own plane in the cross slot.

Slidably mounted on the valve body 1 are two sleeves $f$ the adjacent end portions of which are internally flared; in the illustrated example these end portions are actually conical (with a small cone angle) but they might be part-spherical.

The valve plate 3 has two circular rings $e$ each conforming to the diameter of the valve body and each approximating in width that of the slot 2. One of these rings is open and the other is blanked off by a disc 4. Jointing gaskets $j$ are shown in FIG. 2 fitted in recesses in the outer peripheral surfaces of each of the rings $e$ which are shaped to mate with the flared internal surfaces of the sleeves $f$, but the gaskets are not always necessary.

The sleeves $f$ have limited play on the valve body 1 sufficient to enable them to centralize themselves on the ring $e$ in operation for the time being; they are thin and flexible, the thickness being no more than required to sustain the hoop thrust due to pressure; and their outer ends are attached to the valve body by means of bellows $g$.

Mechanism (not shown and forming no part of the invention) for displacing the sleeves $f$ is arranged to act on flanges $h$ of the sleeves. It is desirable that this mechanism should be mounted on and act between the flanges $h$ of the two sleeves and that no reaction be taken by the body 1.

In order to swing the valve plate 3 from the "open" position to the "blanking off" position, or vice versa, the sleeves $f$ are first retracted from sealing position clear of the cross slot 2, and then the valve plate is swung to the required position, after which the sleeves are urged towards one another again to make sealing contact between their flared ends and that circular ring $e$ now in alignment with the valve body 1.

With the valve described and illustrated irregular contact of the sealing surfaces is eliminated since the flexible nature of the sleeves $f$ will allow the sleeves to contact the conical or part-spherical rings $e$ of the valve plate 3 all round; the thrust F from the closure mechanism causes, by virtue of the wedging action, a much greater radial thrust between the valve plate rings $e$ and the sleeves $f$ and the latter will simulate a tensile band round a cylinder and effectively seal any irregularities in the profile; if for any reason leakage should occur the least path of the escaping gases is along $a$ $b$ $c$ $d$ in FIG. 2, i.e. a zig-zag path giving a labyrinth effect and greatly reducing the velocity and hence the erosion caused by escaping gas; the tendency of the gas pressure to retract the sleeves is in proportion to the tangent of the semi-cone angle and is thus very slight, and by making the cone angle small enough the frictional force between the valve ring and sleeves will effectively retain the joint in the closed position; also the thrust of the closed valve plate is taken between the valve plate ring and the body and is not imposed upon the seal.

The valve plate is of course mounted as usual in a suitable framework forming part of the valve and is provided with mechanism for effecting its displacement, the illustration of which is unnecessary for a clear understanding of the present invention.

I claim:

1. A goggle or plate valve comprising a valve body presenting a cross slot of constant width; two sleeves having adjacent end portions surrounding and slidable on said valve body and adapted to be moved towards and away from one another, said adjacent end portions being internally flared; a valve plate displaceable in said cross slot when said adjacent end portions are moved clear of said slot, said valve plate having pairs of oppositely situated rings to fit in said cross slot, certain of said rings arranged to blank off said valve and certain of said rings arranged to afford clear passage through said valve when disposed in said cross slot, and the perimeters of said rings being externally shaped to conform with the internally flared end portions of said sleeves to provide a tight seal therebetween when said adjacent end portions of said sleeves are moved into abutment with the external perimeter of said rings.

2. A goggle or plate valve comprising a valve body presenting a cross slot of constant width; two sleeves having adjacent end portions surrounding and slidable on said valve body and adapted to be moved towards and away from one another, said adjacent end portions being internally conical; and a valve plate displaceable in said cross slot, said valve plate having pairs of oppositely situated rings to fit in said cross slot, certain of said rings arranged to blank off said valve and certain of said rings arranged to afford clear passage through said valve when disposed in said cross slot, and the perimeters of said rings being externally conical to conform with the internally conical end portions of said sleeves and adapted to seal against the latter when said adjacent end portions are slid to a position where they are covering said cross slot.

3. A goggle or plate valve comprising a valve body presenting a cross slot of constant width; two sleeves having adjacent end portions surrounding and slidable on said valve body and adapted to be moved towards and away from one another, said adjacent end portions being internally flared; a valve plate displaceable in said cross slot when said adjacent end portions are moved clear of said slot, said valve plate having pairs of oppositely situated rings to fit in said cross slot, certain of said rings arranged to blank off said valve and certain of said rings arranged to afford clear passage through said valve when disposed in said cross slot, the perimeters of said rings being externally shaped to conform with the internally flared end portions of said sleeves to provide a tight seal therebetween when said sleeves are moved into abutment with the external perimeters of said rings; and annular bellows attached on one end to the entire peripheries of said slidable sleeves and on the other end to the entire peripheries of said valve body to provide a flexible seal for the ends of the slidable sleeves to which they are connected.

4. A goggle or plate valve comprising a valve body presenting a cross slot of constant width; two sleeves having adjacent end portions surrounding and slidable on said valve body and adapted to be moved towards and away from one another, said adjacent end portions being internally flared; and a valve plate displaceable in said cross slot when said adjacent end portions are moved clear of said slot, said valve plate having pairs of oppositely situated rings to fit in said cross slot, certain of said rings arranged to blank off said valve and certain of said rings arranged to afford clear passage through said valve when disposed in said cross slot, the perimeters of said rings being externally shaped to conform with the internally flared end portions of said sleeves to provide a tight abutment seal therebetween when said sleeves are moved to a position to cover said slot, annular bellows attached on one end to the entire peripheries of said slidable sleeves and on the other end to the entire peripheries of said valve body; and flanges on said sleeves for engagement by mechanism for slidably displacing said sleeves.

5. A goggle or plate valve comprising a valve body presenting a cross slot of constant width; two sleeves having adjacent end portions surrounding and slidable on said valve body and adapted to be moved towards and away from one another, said adjacent end portions being internally flared; and a valve plate displaceable in said cross slot when said adjacent end portions are moved clear of said slot, said valve plate having pairs of oppositely situated rings to fit in said cross slot, certain of said rings arranged to blank off said valve and certain of said rings arranged to afford clear passage through said valve when disposed in said cross slot, the perimeters of said rings being externally shaped to conform with the internally flared end portions of said sleeves; and sealing gaskets housed in recesses formed in the outer peripheries of said rings and adapted to abut said internally flared end portions and form a tight seal therebetween when the latter are slid towards one another to the position where said end portions are covering said cross slot.

References Cited in the file of this patent
UNITED STATES PATENTS
2,419,069    Griffin _____ Apr. 15, 1947